United States Patent
Kim et al.

(10) Patent No.: US 8,291,210 B2
(45) Date of Patent: *Oct. 16, 2012

(54) METHODS OF BOOTING APPLICATION PROCESSORS FROM EXTERNAL DEVICES

(75) Inventors: Yong-Hoon Kim, Yongin-si (KR); Yun-Tae Lee, Seoul (KR); Sung-Up Choi, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/986,264

(22) Filed: Jan. 7, 2011

(65) Prior Publication Data

US 2011/0107076 A1    May 5, 2011

Related U.S. Application Data

(63) Continuation of application No. 11/797,985, filed on May 9, 2007, now Pat. No. 7,873,822.

(30) Foreign Application Priority Data

May 25, 2006  (KR) ................................. 2006-47230

(51) Int. Cl.
    *G06F 9/24*         (2006.01)
(52) U.S. Cl. .............................. 713/2; 710/316; 711/103
(58) Field of Classification Search ...... 713/2; 710/316; 711/103
    See application file for complete search history.

(56) References Cited

U.S. PATENT DOCUMENTS

| | | | |
|---|---|---|---|
| 5,519,843 A | 5/1996 | Moran et al. | |
| 5,535,357 A | 7/1996 | Moran et al. | |
| 7,310,726 B2 | 12/2007 | Hutton et al. | |
| 7,739,487 B2 * | 6/2010 | Mylly et al. | 713/1 |
| 7,930,530 B2 | 4/2011 | Roh et al. | |
| 2003/0172261 A1 * | 9/2003 | Lee et al. | 713/1 |
| 2006/0184724 A1 | 8/2006 | Meir et al. | |
| 2007/0192610 A1 | 8/2007 | Chun et al. | |

FOREIGN PATENT DOCUMENTS

| | | |
|---|---|---|
| JP | 07084776 A | 3/1995 |
| KR | 100247952 B1 | 12/1999 |
| KR | 1020000049321 A | 8/2000 |
| KR | 1020030003611 A | 1/2003 |
| KR | 1020030060342 A | 7/2003 |
| KR | 1020030074106 A | 9/2003 |

* cited by examiner

*Primary Examiner* — Albert Wang
(74) *Attorney, Agent, or Firm* — Myers Bigel Sibley & Sajovec, P.A.

(57) ABSTRACT

An electronic information system comprises an external storage device and an application processor. The external storage device stores boot code and the application processor is adapted to receive the boot code from the external storage device and to perform a system booting operation during a power-up operation by executing the boot code.

18 Claims, 7 Drawing Sheets

Fig. 7

METHODS OF BOOTING APPLICATION PROCESSORS FROM EXTERNAL DEVICES

CROSS REFERENCE TO RELATED APPLICATIONS

This is a continuation application of application Ser. No. 11/797,985 filed on May 9, 2007,which claims priority to Korean Patent Application No. 2006-47230 filed on May 25, 2006. The subject matter of these two documents is hereby incorporated by reference in their entirety.

BACKGROUND OF THE INVENTION

1. Field of the Invention

Embodiments of the invention relate generally to electronic devices. More particularly, embodiments of the invention relate to electronic devices having a booting function.

2. Description of Related Art

Contemporary portable electronic devices tend to require increasingly large amounts of data storage capacity. For example, portable devices such as cellular phones, personal digital assistants (PDAs), and digital cameras may generate large amounts of data requiring temporary or permanent storage. In order to accommodate this increasingly large storage requirement, some portable devices have adapted to interoperate with detachable memory expansion cards or peripherals including non-volatile memory. Examples of the detachable memory expansion cards include so-called "thumb-drives" for personal computers, compact flash cards for digital cameras, and a wide variety of other cards adapted for use with different systems.

Most portable electronic devices are designed to store at least some form of personal information such as credit card or bank account information, personal phone numbers, photographs, social security information, and so on. However, unless precautions are taken, such personal information could be at risk from a potential hacker attack through various interfaces including those to connect the detachable memory expansion cards or peripherals.

For instance, one aspect of portable electronic devices that creates a potential security hazard is the use of a boot memory used to boot up the devices. In general, most electronic devices use a boot up operation to initialize a processor and to set up input/output functions for the devices. In the boot up operation, data and boot code are transferred from the boot memory to the processor. The boot code is used to set up low-level hardware functions of the device and to initialize the device's operating system (OS). Boot code is typically considered to be a part of a device's basic input/output system (BIOS).

Figure 1:
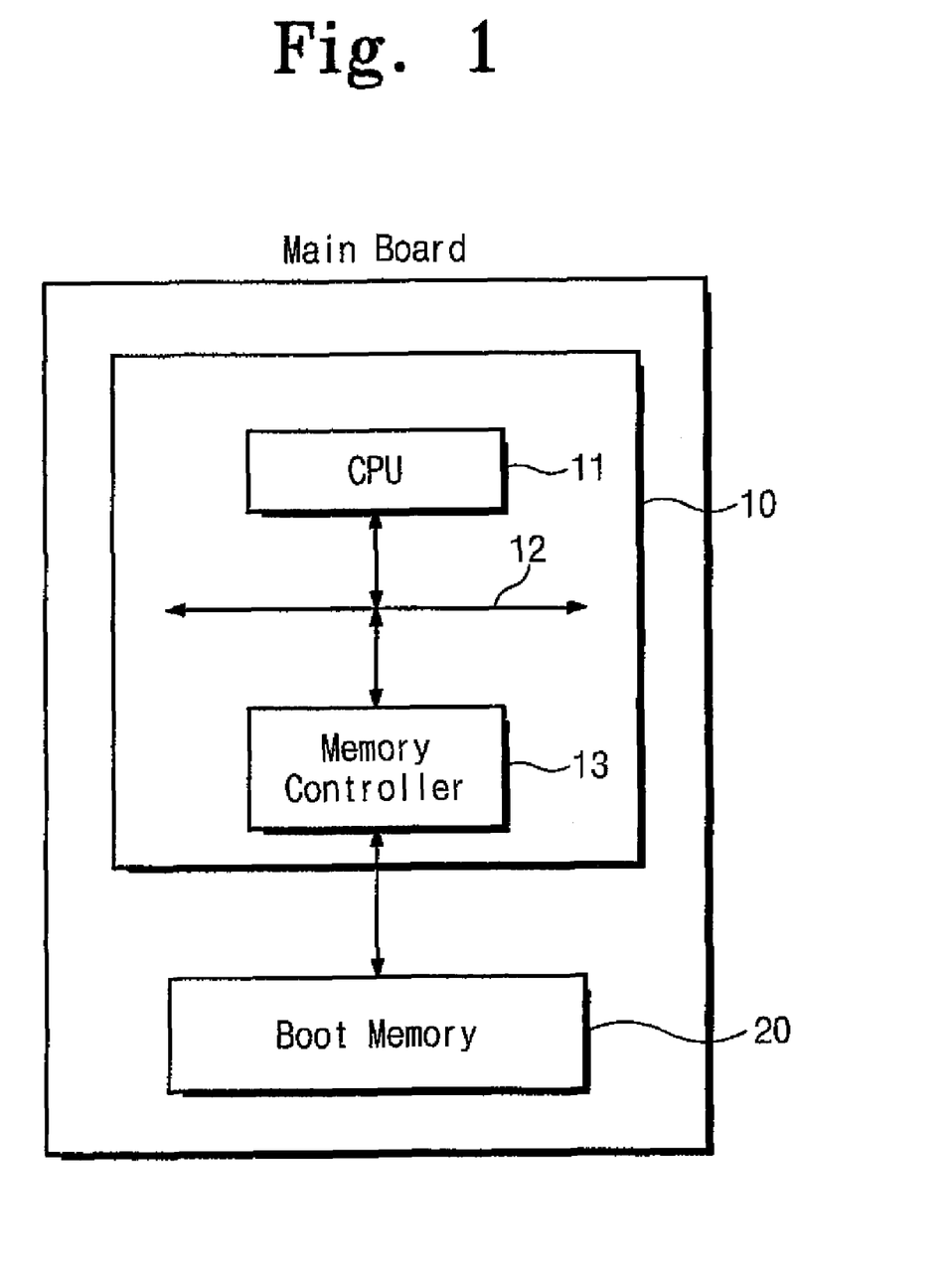
FIG. 1 is a block diagram illustrating a conventional electronic device including a main board having a boot memory.

FIG. 1 is a block diagram illustrating a main board including various elements of a conventional portable electronic device. Referring to FIG. 1, the main board comprises a main host platform 10 and a boot memory 20. Main host platform 10 comprises a central processing unit (CPU) 11, an internal bus 12, and a memory controller 13 operatively connected to CPU 11 via internal bus 12.

Boot memory 20 typically comprises non-volatile memory. Boot memory 20 stores boot code and boot data used to initialize CPU 11 and/or memory controller 13. In general, when the device of FIG. 1 is booted, power is applied to main host platform 10 and boot memory 20, and CPU 11, internal bus 12, and memory controller 13 are reset. Next, a program counter (PC) of CPU 11 is assigned an initial address or value stored in boot memory 20. CPU 11 uses the initial address to read boot code from boot memory 20 and then uses the boot code to boot an operating system (OS) for the device.

Unfortunately, the boot memory in many portable electronic devices undesirably increases the overall size of the main board, and therefore, the overall size of the device. In general, this tends to increase the cost of the device and lower its desirability. In addition, hackers may attempt to use the boot memory as a way to bypass security functions and access personal information stored in the portable electronic devices. Because of this potential security hazard, it may be desirable to introduce additional precautions to prevent tampering with sensitive data.

SUMMARY OF THE INVENTION

Embodiments of the invention provide bootable systems wherein boot code is stored in a non-volatile memory separate from an application processor. Embodiments of the invention further provide interface mechanisms for transferring data between an application processor and an external non-volatile memory to improve booting efficiency. Embodiments of the invention further provide systems including various booting paths for transferring boot code or boot data between an external non-volatile memory and the application processor.

According to one embodiment of the invention, an electronic information system comprises a memory card and an application processor. The memory card stores boot code. The application processor is adapted to receive the boot code from the memory card and to perform a system booting operation during a power-up operation by executing the boot code.

According to another embodiment of the invention, an electronic information system comprises a memory card and an application processor. The memory card comprises a NAND flash memory storing boot code. The application processor is adapted to receive the boot code from the memory card to perform a system booting operation during a power-up operation of the system using the boot code, wherein the application processor comprises a NAND flash controller adapted to directly access the NAND flash memory during the power-up operation.

According to still another embodiment of the invention, an electronic information system comprises a memory, a power-on reset circuit, a booting method setting unit, first through third state machines, and first through third memory controllers. The power-on reset circuit is adapted to generate a reset signal during a power-up operation of the system. The booting method setting unit is adapted to activate one of first, second, and third select signals based on a booting mode of the system during the power-up operation. The first state machine is selected by activation of the first select signal and operates in response to the reset signal. The first memory controller is controlled by the first state machine to read boot code from an external storage device during the power-up operation when the first state machine is selected. The second state machine is selected by activation of the second select signal and operates in response to the reset signal. The second memory controller is controlled by the second state machine to read the boot code from the external storage device during the power-up operation when the second state machine is selected. The third state machine is selected by activation of the third select signal and operates in response to the reset signal. The third memory controller is controlled by the third state machine to read the boot code from the external storage device during the power-up operation when the third state machine is selected. The boot code is stored in the memory under the control of the selected state machine.

BRIEF DESCRIPTION OF THE DRAWINGS

Embodiments of the invention are described below with reference to the corresponding drawings. In the drawings, like reference numerals are used to refer to like elements, components, or operations. In the drawings.

DESCRIPTION OF EXEMPLARY EMBODIMENTS

Exemplary embodiments of the invention are described below with reference to the accompanying drawings. These embodiments are presented as teaching examples while the scope of the invention is defined by the claims that follow.

In general, embodiments of the invention include various digital electronic devices such as mobile devices, personal computers, peripheral devices, and so on, and related external memory cards. The devices are adapted to interact with the external memory cards, and the external memory cards include boot memories adapted to store boot code to be accessed during booting operations of the respective devices.

The memory cards described below could be embodied, for example, by high-capacity memory cards such as secure digital (SD) cards, compact flash (CF) cards, memory sticks, multi-media cards (MMCs), and a variety of other storage media capable of exchanging data with digital devices using known or conceivable interface methods.

Figure 2:
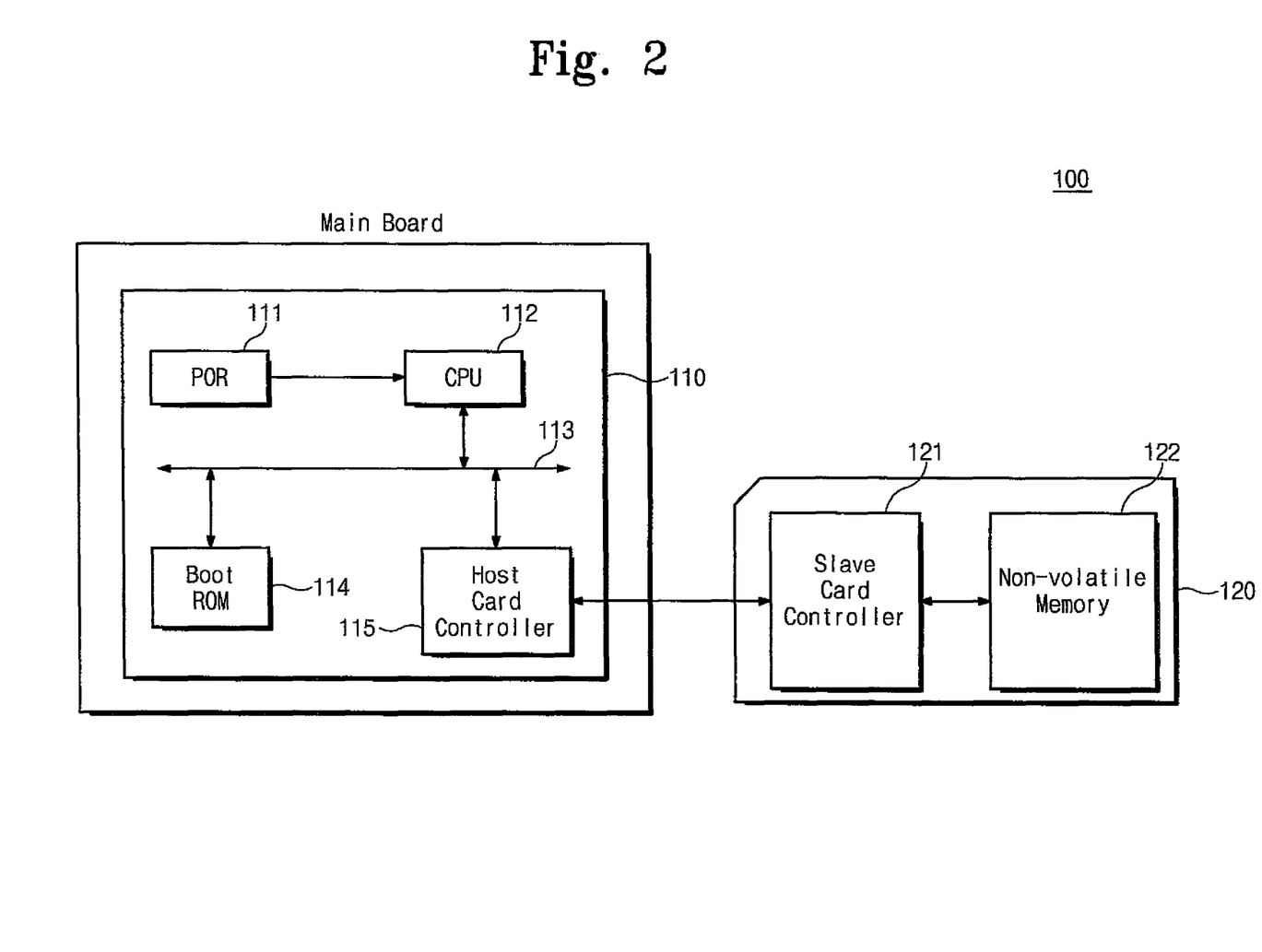
FIG. 2 is a block diagram of an electronic information system comprising an electronic device connected to an external memory card according to one embodiment of the invention.

FIG. 2 is a block diagram of an electronic information system 100 according to one embodiment of the invention. Referring to FIG. 2, electronic information system 100 comprises an application processor 110 located on a main board, and a memory card 120 storing boot code. Electronic information system 100 cannot be booted without memory card 120, which provides the boot code to application processor 110 when power is applied to electronic information system 100.

Application processor 110 can be mounted in various platforms to perform specific functions. For example, in one embodiment, application processor 110 comprises a modem adapted to transmit and receive data and a multimedia coprocessor (MC).

In the embodiment illustrated in FIG. 2, application processor 110 comprises a power-on reset (POR) circuit 111, a CPU 112, a boot read only memory (ROM) 114, a host card controller 115, and an internal bus 113.

POR circuit 111 provides a reset signal to perform a reset operation on elements such as CPU 112 within application processor 110 when power is applied to system 100. The reset signal is generated as a pulse signal at a reset time when an internal operating voltage of application processor 110 rises above a predetermined level.

After being reset by the reset signal, CPU 112 reads initialization data from boot ROM 114, and sets up host card controller 115 using the initialization data. CPU 112 requests boot code and boot data stored in memory card 120 via host card controller 115 to boot the system. Internal bus 113 transfers data and control signals between internal components of application processor 110.

The initialization data stored in boot ROM 114 comprises instructions and data for performing at least some initialization on application processor 110. For example, the initialization data stored in boot ROM 114 typically contains values and/or instructions for initializing interface devices such as host card controller 115, and for fetching boot code from memory card 120 via host card controller 115. The instructions for initializing application processor 110 are typically performed by CPU 112 and generally contain at least loop information for reading the boot code.

Host card controller 115, which is initialized by CPU 112, interfaces with memory card 120 under the control of CPU 112. Initialized host card controller 115 allows application processor 110 to read data, including boot code, stored in memory card 120 according to a predetermined protocol.

Memory card 120 is a portable non-volatile memory device that is detachable from application processor 110. Various data can be exchanged between memory card 120 and a variety of other devices such as application processor 110.

Memory card 120 comprises a slave card controller 121 corresponding to host card controller 115 and a non-volatile memory 122. Non-volatile memory 122 typically comprises NAND flash memory. However, other types of non-volatile memory could be used in place of the NAND flash memory. For example, non-volatile memory 122 could include NOR flash memory. Memory card 120 typically comprises a memory card such as a SD card, a MMC, a memory stick, or a CF card.

Once power is applied to application processor 110, CPU 112 is initialized in response to the reset signal generated by POR circuit 111. Next, CPU 112 reads the initialization data from boot ROM 114. Host card controller 115 is initialized by CPU 112 using the initialization data. Once host card controller 115 is initialized, CPU 112 reads the boot code from memory card 120 through host card controller 115.

A booting operation of the system is performed using the boot code under the control of CPU 112. Because application processor 110 does not store the boot code used to boot the system, security hazards that may arise from storing the boot code in a boot memory residing in application processor 110 are avoided. As a result, the system may be better able to protect private information.

Figure 3:
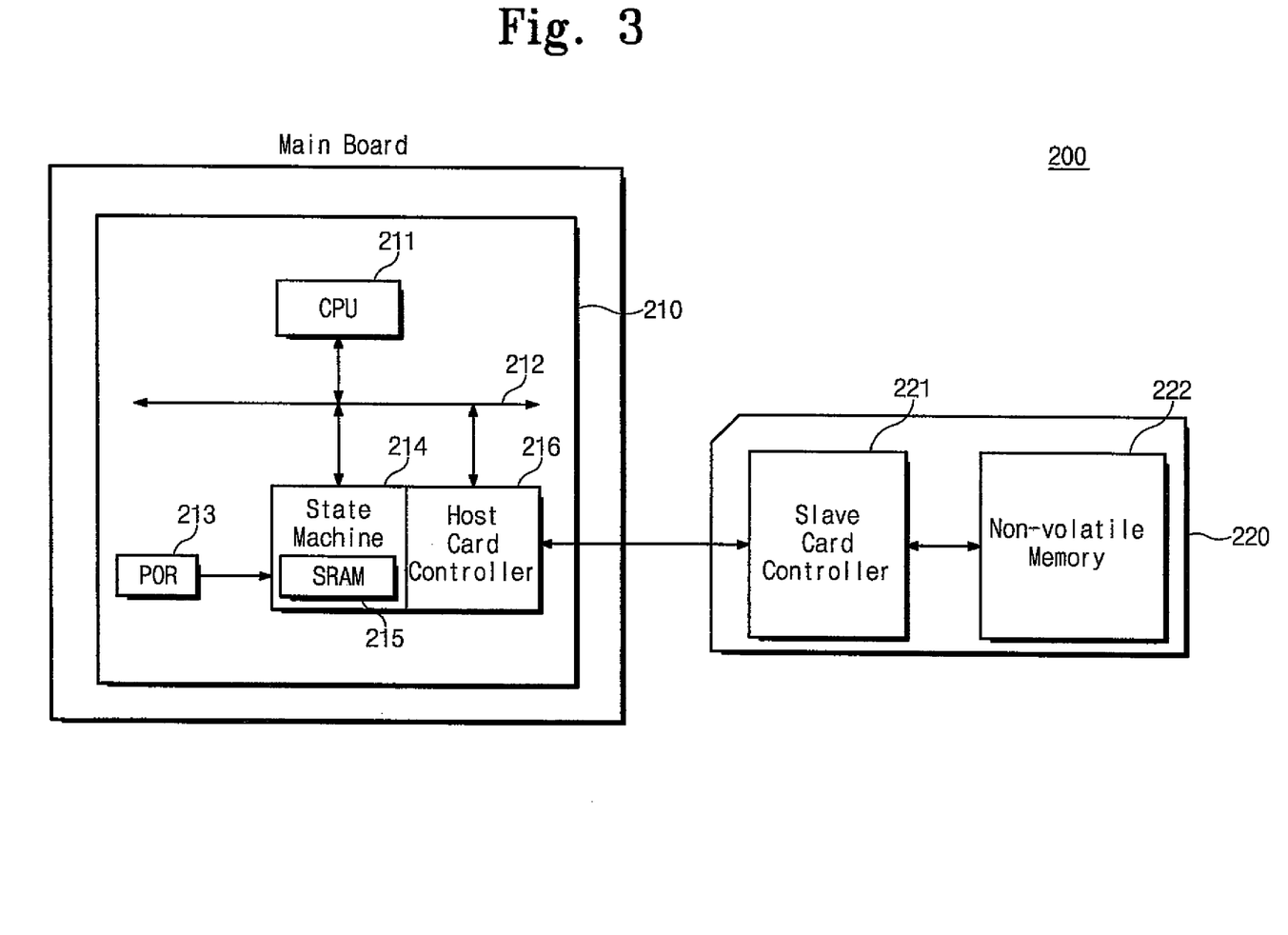
FIG. 3 is a block diagram of an electronic information system comprising an electronic device connected to an external memory card according to another embodiment of the invention.

FIG. 3 is a block diagram of an electronic information system 200 according to another embodiment of the invention. Referring to FIG. 3, system 200 comprises an application processor 210 located on a main board, and a detachable memory card 220 operatively connected to application processor 210.

Application processor 210 comprises a CPU 211, a POR circuit 213, a state machine 214 comprising a static random access memory (SRAM) 215, a host card controller 216, and an internal bus 212.

Application processor 210 receives boot code from memory card 220 before CPU 211 is initialized. State machine 214 copies the boot code from memory card 220 into SRAM 215.

Unlike system 100 described above, CPU 211 does not need to initialize host card controller 216 before a booting operation of system 200 is performed. Instead, CPU 215 performs the booting operation after the boot code is loaded into SRAM 215. CPU 211 executes the boot code in response to having its program counter set to a predetermined booting address by SRAM 215 during the booting operation.

Typically, SRAM 215 receives the booting address from memory card 220 as a first target address (e.g., 0xFFFF0H in an 80×86 series processor). CPU 211 performs operations to establish general settings for system 200 based on instructions accessible via the booting address. Accordingly, state machine 214 first fetches the boot code from memory card 220 and then stores the boot code in SRAM 215. Then, CPU 211 accesses SRAM 215 to fetch the boot code. Internal bus 212 transfers data between CPU 211, SRAM 215, and host card controller 216.

POR circuit 213 generates a reset signal when a power voltage level of application processor 210 is provided during a power-up operation. The reset signal is provided first to state machine 214 so that state machine 214 copies the boot code from memory card 220 into SRAM 215 before the booting operation.

State machine 214 performs a control operation (See, FIG. 4) in response to the reset signal. Upon receiving the reset signal, state machine 214 initializes host card controller 216. Prior to receiving the reset signal in the power-up operation, state machine 214 assumes a wait-state in which it awaits the reset signal.

State machine 214 controls initialized host card controller 216 to determine whether or not memory card 220 is connected to application processor 220. Where memory card 220 is connected to application processor 210, the boot code is copied into SRAM 215.

In some cases, state machine 214 and SRAM 215 may be used only for the booting operation. In such cases, state machine 214 is deactivated after the boot code is stored in SRAM 215. Once the boot code is stored in SRAM 215, CPU 211 accesses SRAM 215 to retrieve the first target address used to perform the booting operation. Next, remaining data needed to initialize or boot application processor 210 is transferred from memory card 220 to application processor 210 via host card controller 216.

Host card controller 216 is initialized by state machine 214 and transfers the boot code to SRAM 215. In addition, host card controller 216 transfers other data between memory card 220 and application processor 210 during normal operation of the system.

Memory card 220 comprises a slave card controller 221 and a non-volatile memory 222 such as a NAND flash memory. Non-volatile memory 220 stores the boot code and slave card controller provides functionality for interface operations between memory card 220 and application processor 210.

The boot code stored in memory card 220 is copied into SRAM 215 under the control of state machine 214 when initial power is applied to system 200. As a result, system 200 can be booted without including a boot memory in application processor 210.

Figure 4:
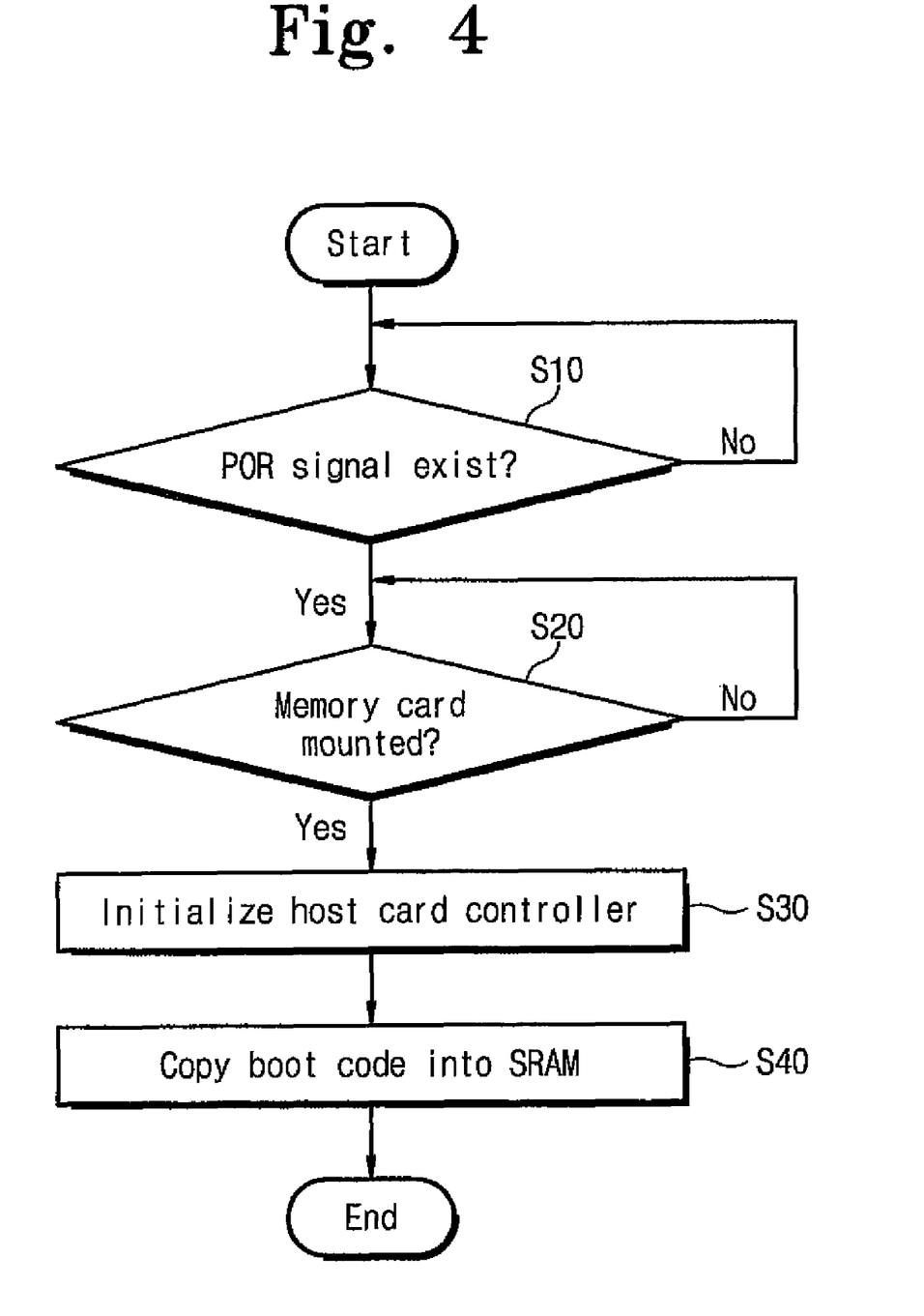
FIG. 4 is a flowchart illustrating the operation of the system illustrated in FIG. 3.

FIG. 4 is a flowchart illustrating the operation of system 200. In particular, FIG. 4 illustrates operations for transferring data from memory card 220 to SRAM 215 under the control of state machine 214 in response to the reset signal generated by POR circuit 213. In the description that follows, operations illustrated in the flowchart will be denoted by parentheses (SXX).

Referring to FIG. 4, where power is applied to system 200, state machine 214 initially stands by and awaits the reset signal from POR circuit 213 (S10=NO). Upon receiving the reset signal (S10=YES), state machine 214 detects whether memory card 220 is connected to application processor 210 (S20). Whether or not memory card 220 is connected to application processor 210 is determined by detecting a signal from memory card 220 via host card controller 216. Where memory card 220 is connected to application processor 210 (S20=YES), state machine 214 initializes host card controller 216 (S30). Otherwise (S20=NO), state machine 214 continues to detect whether memory card 220 is connected to application processor 210.

Host card controller 216 is initialized to access data stored in memory card 220 and then copies the data into SRAM 215. Following initialization operations, state machine 214 reads the boot code stored in memory card 220 and stores the boot code in SRAM 215 through host card controller 216 (S40). Once the boot code is stored in SRAM 215 and state machine 214 has initialized the PC of CPU 211 with the first target address, control of the booting operation is transferred to CPU 211.

Figure 5:
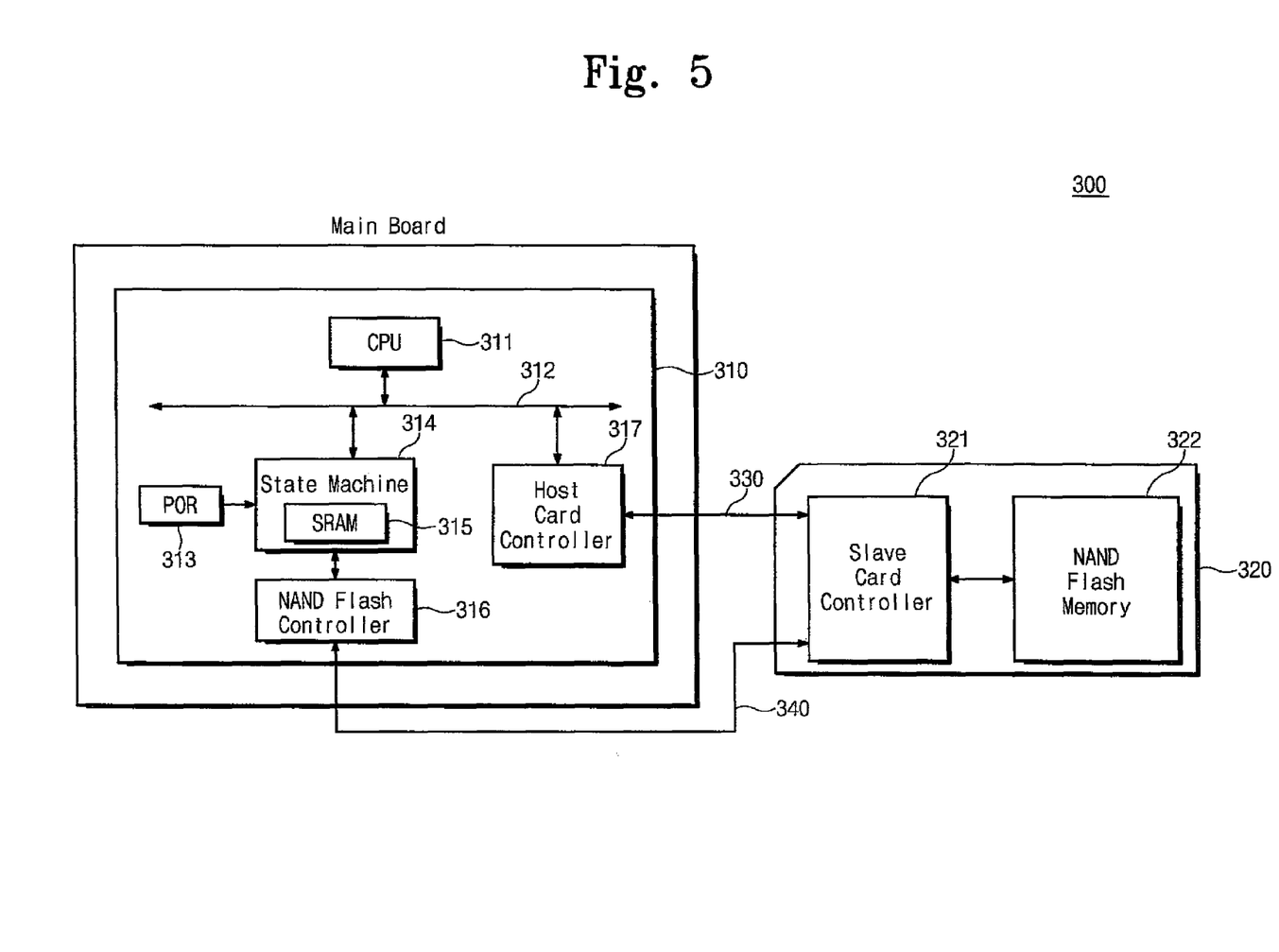
FIG. 5 is a block diagram of an electronic information system comprising an electronic device connected to an external memory card according to still another embodiment of the invention.

FIG. 5 is a block diagram of an electronic information system 300 according to another embodiment of the invention. Referring to FIG. 5, system 300 fetches boot code through a different path from systems 100 and 200. System 300 comprises a CPU 311, a POR circuit 313, a state machine 314 comprising a SRAM 315, a NAND flash controller 316, a host card controller 317, and an internal bus 312. In addition, system 300 comprises an additional interface not included in systems 100 or 200 for transferring data from memory card 320 to application platform 310.

In a booting operation of system 300, CPU 311 boot code is transferred from memory card 320 to SRAM 315 under the control of state machine 314. State machine 314 uses the boot code to initialize a program counter of CPU 311. Then, CPU 311 performs further operations for the booting operation.

Internal bus 312 transfers data between state machine 314, SRAM 315, and host card controller 317. POR circuit 313 generates a reset signal and inputs the reset signal to state machine 314 when an internal power voltage of system 300 reaches a stable level during a power-up operation.

State machine 314 performs control operations and initializes various elements of application processor 310 in response to the reset signal. For example, state machine 314 awaits the reset signal and then initializes NAND flash controller 316 upon receiving the reset signal. Following initialization, NAND flash controller 316 accesses a NAND flash memory 322 of memory card 320 through a data path 340. Then, NAND flash controller 316 reads the boot code through data path 340 and stores the boot code in SRAM 315. SRAM 315 stores the boot code that read from memory card 320 through NAND flash controller 316 under the control of state machine 314.

NAND flash controller 316 comprises another interface for directly accessing NAND flash memory 322 from application processor 310 in addition to host card controller 317. NAND flash controller 316 interfaces with application processor 310 during the booting operation, to deliver commands and data relating to pin compositions, read/write operations of NAND flash memory 322.

Host card controller 317 does not need to be initialized by state machine 314. Instead, a data exchange between memory card 320 and application processor 310 via host card controller 317 can be performed during the booting operation after the boot code is stored in SRAM 315 and then transferred to CPU 311.

A slave card controller 321 in memory card 320 switches the connection between NAND flash memory 322 and NAND flash controller 316 according to settings stored in state machine 313. Slave card controller 321 typically stops an interface operation with NAND flash controller 316 in response to a control signal from NAND flash controller 316 generated under the control of state machine 314.

Slave card controller 321 may perform a switching operation to electrically connect NAND flash memory 322 with NAND flash controller 316. Slave card controller 321 comprises a memory card that switches data path 340 to fetch the boot code for SRAM 315 of application processor 310 where NAND flash controller 316 is activated. Once the boot code is copied by state machine 314, slave card controller 321 cuts off data path 340 from NAND flash memory 322. Then, a data path 330 is used to transfer data between host card controller 317 and memory card 320 in general interface operations.

NAND flash memory 322 provides a storage medium for memory card 320. NAND flash memory 322 is typically connected to slave card controller 321 through an I/O pin and pins corresponding to control signals nCE, nOE, nEW, and nWP. Slave card controller 321 converts signals and data received from host card controller 317 using an interface protocol of memory card 320, into a protocol of used by NAND flash memory 322 to read and write data. NAND flash memory 322 stores the boot code used in the booting operation. In addition, NAND flash memory 322 may store private user information such as a user ID and security code to improve the security of system 300. Moreover, NAND flash memory 322 typically includes a mechanism to prevent the boot code and/or the private user information from being lost or erased by mistake.

In system 300, application processor 310 and memory card 320 include interfaces not included in systems 100 and 200. The interface connected via data path 340 allows memory card 320 to communicate boot data to SRAM 315 via NAND flash controller 316.

During the booting operation of system 300, state machine 314 performs control operations to cause the boot code to be transferred from memory card 320 to SRAM 315 via data path 340. Accordingly, the boot code is not transferred to SRAM 315 via host card controller 317.

Because NAND flash controller 316 and NAND flash memory of memory card 320 are directly connected to each other, a small amount of data such as the boot code can be quickly transferred to SRAM 315 via NAND flash controller 316. As a result, the time required to perform the booting operation can be reduced. On the other hand, those skilled in the art will recognize that the addition of data path 340 will tend to increase the number of pins in memory card 320 and application processor 310.

Figure 6:
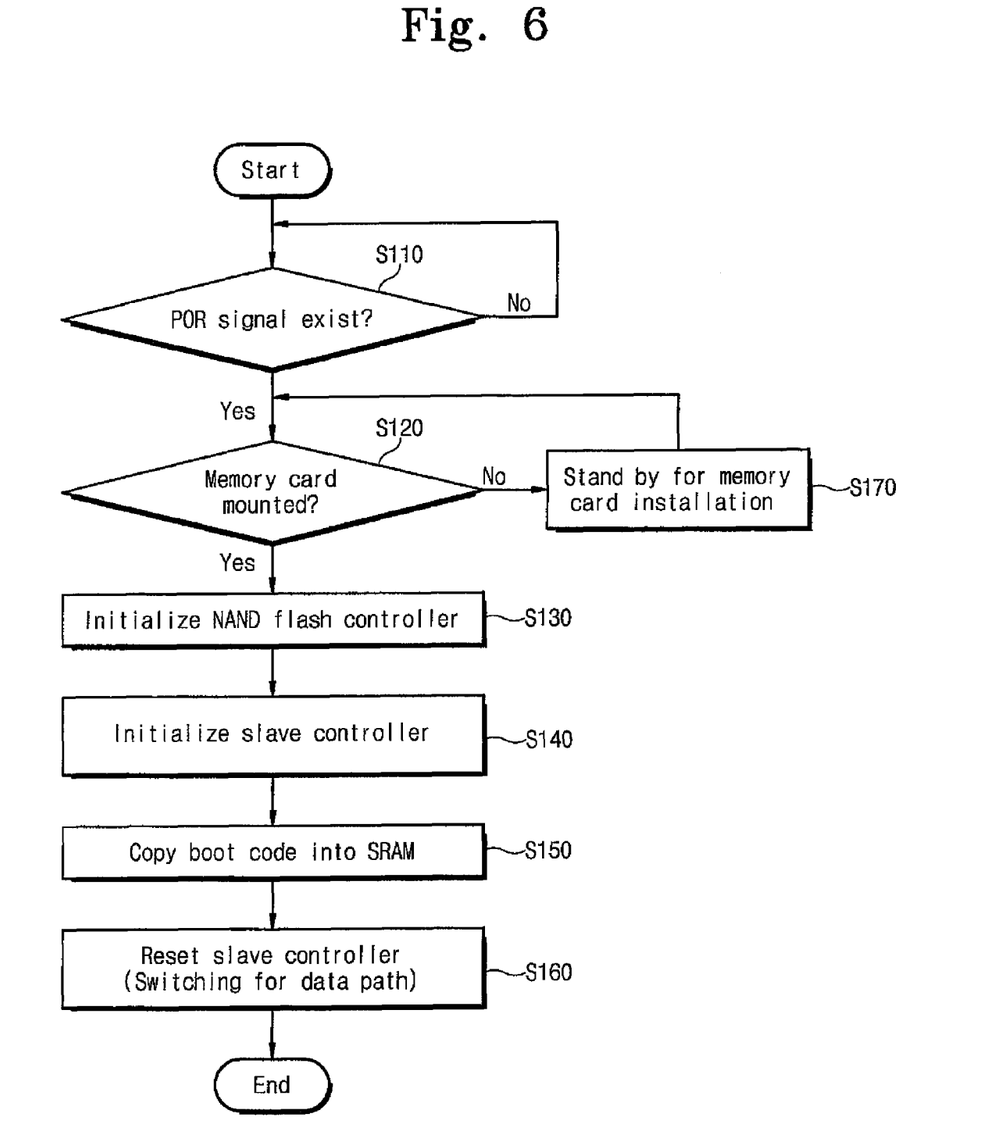
FIG. 6 is a flowchart illustrating the operation of the system illustrated in FIG. 5.

FIG. 6 is a flowchart illustrating the operation of state machine 314 in FIG. 5. In general, FIG. 6 illustrates the process of copying the boot code from memory card 320 into SRAM 315 after power is applied to system 300.

Referring to FIG. 6, state machine 314 first detects whether or not POR circuit 313 generates the reset signal (S110). Where POR circuit 313 generates the reset signal (S110=YES), state machine 314 determines whether memory card 320 is connected to application processor 310 (S120). Otherwise (S110=NO), state machine 314 waits for POR circuit 313 to generate the reset signal.

Where memory card 320 is connected to application processor 310 (S120=YES), state machine 314 initializes NAND flash controller 316 (S130). Otherwise (S120=NO), state machine 314 stands by and waits for memory card 320 to be connected to application processor 310 (S170).

After NAND flash controller 316 is initialized, state machine 314 initializes slave card controller 321 (S140). The initialization of slave card controller 321 is typically performed as a switching operation apart from general interfacing setup operations.

During the initialization of slave card controller 321 switching operations are performed to electrically connect NAND flash controller 316 with NAND flash memory 322. As a result, where NAND flash controller 316 and slave card controller 321 are initialized, data path 340, i.e., a delivery path of the boot code, is activated. Next, state machine 314 copies the boot code from NAND flash memory 322 into SRAM 315 through data path 340 (S150). Once the boot code has been copied to SRAM 315, state machine 314 blocks data path 340 and deactivates slave card controller 321 and NAND flash controller 316 (S160). Next, state machine 314 copies the first target address to CPU 311 to begin general booting operations.

As described above, by using state machine 314 to copy the boot code from memory card 320 to SRAM 315 via data path 340, system 300 improves the speed of the booting operation.

Figure 7:
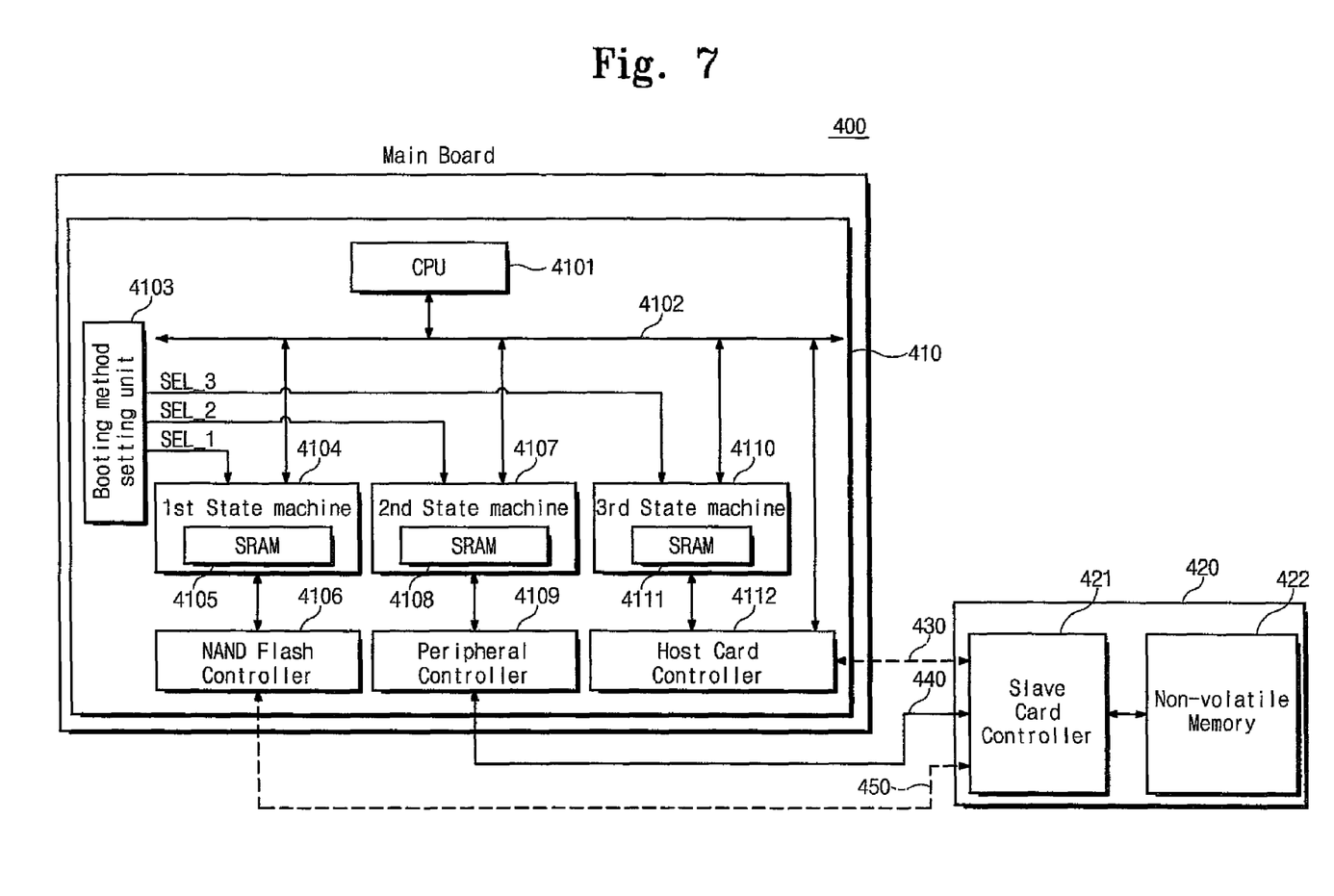
FIG. 7 is a block diagram of an electronic information system comprising an electronic device connected to an external memory card according to still another embodiment of the invention.

FIG. 7 is a block diagram of an electronic information system 400 according to still another embodiment of the invention. Referring to FIG. 7, system 400 comprises an application processor 410 located on a main board, and a memory card 420 connected to application processor 410.

Application processor 410 comprises state machines 4104, 4107, and 4110 and controllers 4106, 4109, and 4112 each adapted to access data stored in memory card 420. Controllers 4106, 4109, and 4112 are each designed to interface with memory card 420 and to store boot code in corresponding SRAMs 4105, 4108, and 4111 in respective state machines 4104, 4107, and 4110.

Application processor 410 can be booted using the respective interfaces provided by controllers 4106, 4109, and 4112. Controller 4112 is a host card controller adapted to manage interface protocols used by the respective interfaces. Controllers 4112 may use any of various communication protocols and may access data such as boot code stored in memory card 420. Controller 4106 is a NAND flash controller, and controller 4109 is a peripheral controller. NAND flash controller 4106 directly fetches boot code from memory card 420 (i.e., from non-volatile memory such as a NAND flash memory within memory card 420). Peripheral controller 4109 directly accesses peripheral devices that use non-volatile memory as a storage medium.

Application processor 410 further comprises a booting method setting unit 4103. Booting method setting unit 4103 comprises a circuit adapted to select a booting path from among booting paths passing through controllers 4106, 4109, and 4112. In other words, booting method setting unit 4103 can determine whether boot code and/or boot data is loaded into application processor 410 via data paths 450, 440, or 430.

CPU 4101 accesses one of SRAMs 4105, 4108, or 4111 based on the booting path selected by booting method setting unit 4103. CPU 4101 then fetches the boot code via the selected booting path and performs general booting operations. An internal bus 4102 transfers internal data between CPU 4101 and other elements of application processor 410 during the booting operation and other operations.

Booting method setting unit 4103 is generally configured to activate only one booting method based on a user choice. For example, where memory card 420 is used for booting, booting method setting unit 4103 activates state machine 4104 and performs a general boot code fetching operation to copy boot code stored in memory card 420 into SRAM 4105. Where state machine 1404 is activated, state machine 4107 and state machine 4110 are deactivated. Accordingly, data path 450 is used to transfer the data from memory card 420 to application processor 410.

Where any of state machines 4104, 4107, or 4110 is activated, the boot code is fetched through a corresponding data path and stored in a corresponding SRAM among SRAMs 4105, 4108, and 4111. Although the embodiment of FIG. 7 allows the booting operation to be carried out through three different booting paths, those skilled in the art will recognize that the booting operation can be carried out through other data paths or via different peripheral devices or interfaces. In other words, the embodiment of FIG. 7 is disclosed as a teaching example to illustrate various inventive concepts.

Where a user elects to boot system 400 using memory card 420, booting method setting unit 4103 outputs a select signal SEL_1. First state machine 4104 performs a fetch operation of the boot code in response to select signal SEL_1. The order in which state machine 4104 controls the fetching of boot code during the booting operation is similar to that illustrated in FIG. 6. For instance, NAND flash interface 4106 is initialized and slave card controller 421 switches to data path 450 to directly connect to NAND flash controller 4106 with non-volatile memory 422. Next, the boot code in non-volatile memory 422 is stored in SRAM 4105.

Where the user elects to boot system 400 using the booting path including state machine 4107, booting method setting unit 4103 outputs a select signal SEL_2 to activate state machine 4107. State machine 4107 controls peripheral controller 4109 to fetch the boot code from a non-volatile memory associated with a peripheral device and then stores the boot code in SRAM 4108. In FIG. 7, data path 440 is illustrated with a solid line to indicate a case where state machine 4107 is activated.

Where the user elects to boot system 400 using the booting path through host card controller 4112, booting method setting unit 4103 outputs a select signal SEL_3 to activate state machine 4110. Where state machine 4110 is selected, a fetch operation of the boot code is performed similar to in system 200. Where state machine 4110 is activated, a switching operation for selecting an additional path is unnecessary at an initialization of host card controller 4112 and slave card controller 421. Where the boot code is stored in SRAM 4111 through host card controller 4112, the boot code is stored by using an interface protocol shared by memory card 420 and application processor 410. Accordingly, where state machine 4110 is activated, data path 430 is used to transfer boot code as well as other data between memory card 420 and application processor 410.

Although not illustrated, each of state machines 4104, 4107, and 4110 starts a control operation in response to a reset signal from a power-on reset circuit in application processor 410. Booting method setting unit 4103 activates one of select signals SEL_1, SEL_2, and SEL_3 in response to the reset signal.

In system 400, various different booting paths are used without requiring application processor 410 to include a boot memory. Although memory card 420 is mounted apart from the main board in FIG. 7, memory card 420 could be located in different parts of a system, e.g., inside, or elsewhere.

As described above in relation to various embodiments, systems booted by boot code stored in a memory card may improve private information protection and security. Additionally, a memory controller may be included in an application processor to directly access a storage medium in the memory card to improve booting efficiency. Moreover, a wide selection of different external memory cards or peripheral devices may be used to perform the booting operation by providing different booting paths and interface protocols for the different cards or devices.

The foregoing exemplary embodiments are disclosed as teaching examples. Those skilled in the art will recognize that various changes may be made to the exemplary embodiments without departing from the scope of the invention as defined by the claims.

What is claimed is:

1. A method of operating an application processor to fetch boot code comprising:

generating a reset signal during a power-up operation of the application processor;

fetching boot code from an external NAND flash memory, that is external to the application processor, through an external slave card controller and through a NAND flash controller circuit in the application processor to provide fetched boot code;

storing the fetched boot code in a memory included in the application processor;

accessing data stored in the external NAND flash memory through the external slave card controller and through a host card controller in the application processor after fetching the boot code is complete;

accessing the fetched boot code in the memory using a central processing unit in the application processor; and executing the fetched boot code on the central processing unit.

2. The method of claim 1 wherein the memory is included in a state machine in the application processor.

3. The method of claim 1 wherein the memory is coupled to the central processing unit via an internal bus in the application processor.

4. The method of claim 3 further comprising:

accessing data stored in the external NAND flash memory through the NAND flash controller circuit after booting is complete.

5. The method of claim 1 further comprising:

initializing the NAND flash controller circuit before fetching the boot code.

6. The method of claim 1 wherein the fetched boot code includes a first target address.

7. The method of claim 6 further comprising:

setting a program counter included in the central processing unit to the first target address before executing the boot code on the central processing unit.

8. A method of operating an application processor to fetch boot code comprising:

generating a reset signal during a power-up operation of the application processor using a power-on reset circuit;

selecting one controller circuit from among a NAND flash controller circuit in the application processor and a peripheral controller circuit in the application processor, using a booting method unit circuit in the application processor, to provide a selected controller circuit;

fetching boot code from external to the application processor, using the selected controller circuit to provide fetched boot code;

storing the fetched boot code in a memory in the application processor; and
executing the fetched boot code.

9. The method of claim 8 wherein selecting one controller circuit comprises selecting the one controller circuit based on user input.

10. The method of claim 8 further comprising:
initializing the selected controller circuit in response to the reset signal.

11. The method of claim 8 wherein selecting one controller circuit comprises selecting the NAND flash controller circuit and wherein fetching boot code comprises fetching the boot code from an external memory card including an external NAND flash memory and a slave card controller circuit therein.

12. The method of claim 11 wherein fetching the boot code comprises transferring the boot code through the slave card controller circuit and through the NAND flash controller circuit to the memory.

13. The method of claim 11 wherein fetching the boot code is preceded by setting the slave card controller circuit to allow access to the external NAND flash memory.

14. The method of claim 11 wherein fetching the boot code comprises transmitting NAND flash commands to the external NAND flash memory.

15. The method of claim 8 wherein selecting one controller circuit comprises selecting the one controller circuit from among the NAND flash controller circuit in the application processor, the peripheral controller circuit in the application processor, and a host card controller circuit in the application processor.

16. The method of claim 8 wherein selecting one controller circuit comprises selecting the host card controller circuit in the application processor and wherein fetching the boot code comprises fetching the boot code from an external memory card including an external NAND flash memory and a slave card controller circuit therein.

17. The method of claim 8 wherein fetching the boot code comprises transferring the boot code through the slave card controller circuit and through the host card controller circuit to the memory.

18. A method of operating an application processor to fetch boot code comprising:
generating a reset signal during a power-up operation of the application processor using a power-on reset circuit;
selecting one controller circuit from among a NAND flash controller circuit in the application processor and a host card controller circuit in the application processor, using a booting method unit circuit in the application processor, to provide a selected controller circuit;
initializing the selected controller circuit in response to the reset signal;
fetching boot code from external to the application processor, using the selected controller circuit, to provide fetched boot code;
storing the fetched boot code in a memory in the application processor; and
executing the fetched boot code.

* * * * *